United States Patent [19]

Fabian

[11] Patent Number: 4,478,621
[45] Date of Patent: Oct. 23, 1984

[54] PROCESS FOR THE EXTRACTION OF CARBON MONOXIDE FROM GAS STREAMS

[75] Inventor: Rainer Fabian, Geretsried, Fed. Rep. of Germany

[73] Assignee: Linde Aktiengesellschaft, Fed. Rep. of Germany

[21] Appl. No.: 488,402

[22] Filed: Apr. 25, 1983

[30] Foreign Application Priority Data

Apr. 28, 1982 [DE] Fed. Rep. of Germany ....... 3215829

[51] Int. Cl.³ ................................................ F25J 3/02
[52] U.S. Cl. ........................................... 62/31; 62/34; 62/39
[58] Field of Search .................... 62/27, 28, 30, 38, 39, 62/29, 31–34, 42, 43, 41

[56] References Cited

U.S. PATENT DOCUMENTS 3,407,146 10/1968 Becker et al. ............................ 62/28
4,102,659 7/1978 Martin ..................................... 62/28
4,311,496 1/1982 Fabian ..................................... 62/28

Primary Examiner—Frank Sever

Attorney, Agent, or Firm—Lerner, David, Littenberg, Krumholz & Mentlik

[57] ABSTRACT

Processes for the separation of carbon monoxide from feed gas streams polluted with nitrogen are disclosed, in which the feed gas streams, which preferably include hydrogen and methane therein, are supplied to a distillation column, and including the steps of distilling the feed gas stream to produce as the sump product a first carbon monoxide stream of substantially pure liquid carbon monoxide, and a distillation gas stream containing nitrogen therein, heating the sump in the lower portion of the distillation column by contact with a second carbon monoxide stream, withdrawing the sump product from the distillation column, expanding the withdrawn sump product to reduce its temperature, cooling the distillation gas stream in the upper portion of the distillation column by contact with at least a portion of the expanded sump product, recycling at least a portion of the first carbon monoxide stream to provide the second carbon monoxide stream, and withdrawing at least a portion of the first carbon monoxide stream as a product stream.

15 Claims, 2 Drawing Figures

PROCESS FOR THE EXTRACTION OF CARBON MONOXIDE FROM GAS STREAMS

FIELD OF THE INVENTION

The present invention relates to processes for the extraction or separation of carbon monoxide from nitrogen polluted gas streams, and particularly from those containing hydrogen, carbon monoxide and methane. More particularly, the present invention is directed to such processes in which the gas stream is separated at low temperatures, at which the carbon monoxide fraction is extracted from the nitrogen polluted streams. Still more particularly, the present invention is directed to such processes in which a portion of the carbon monoxide is entered into the overall cycle as a recycle stream so as to provide at least a portion of the cooling requirement in the process, with the remaining portion being withdrawn as product therefrom.

BACKGROUND OF THE INVENTION

Carbon monoxide is usually produced by the catalytic conversion of natural gas, or by the parial oxidation of heavy oils. The synthetic gases produced in these processes are generally separated from the accompanying gases, primarily hydrogen and methane, by means of low temperature separation processes. If considerable quantities of nitrogen are contained in these streams, the nitrogen that remains in these synthetic gases will cause problems in the low temperature separation. When for example, synthetic gases are produced by steam reforming of natural gas, if more than about 2% nitrogen is present in the natural gas, this will result in an undesirable high content of nitrogen in the carbon monoxide product stream.

Higher nitrogen contents most frequently occur in connection with the use of gaseous feedstocks, such as in the use of natural gas, or various refinery gases containing nitrogen. Various methods have thus been employed in order to solve these problems associated with the presence of such amounts of nitrogen. Firstly, instead of subjecting a gaseous feedstock containing nitrogen to a conversion step, e.g. to a steam reforming process, in some cases an oil- or coal gasification process may be used, since as a rule these feedstocks have lower nitrogen levels. However, apart from the fact that by doing so one thus has to use another feedstock, there is also the disadvantage of this not necessarily being the most cost efficient process. Hence, such gasification processes in connection with installations with a production of less than 5000 Nm$^3$/h of carbon monoxide are generally considered to be too costly. Another possibility is simply to accept the nitrogen content of the carbon monoxide stream, as long as it is within reasonable limits. While this is, in itself, basically a very simple process, it does have the disadvantage that further processing of the carbon monoxide product becomes very difficult and costly. Yet another possibility is to subject the gaseous feedstock to a nitrogen separation step prior to its conversion. However, this solution requires a second low temperature separation prior to the conversion, along with the necessary preliminary purification steps. This process thus entails considerable additional expense. Finally, it is also possible to separate the carbon monoxide from the gas stream by using a scrubbing process instead of the low temperature separation process. However, the known procedures for such scrubbing processes are quite difficult to perform, particularly since the scrubbing liquids are toxic and corrosive, and since the process requires costly auxiliary equipment, especially for the final purification.

Processes for the production of carbon monoxide from natural gas containing nitrogen, during which nitrogen is separated from the natural gas prior to the conversion, are known, see e.g., "Linde-Reports on Science and Technology," 18, 1973, pages 3 to 6.

The present invention is directed toward the development of a procedure for facilitating the extraction of nitrogen-free carbon monoxide in the simplest possible way.

SUMMARY OF THE INVENTION

In accordance with the present invention, these and other problems have now been solved by the discovery of a process in which a nitrogen polluted carbon monoxide stream is separated into a carbon monoxide fraction and a nitrogen fraction containing additional carbon monoxide, in which the lower end or sump of a distillation column is heated with recycled carbon monoxide, and in which the carbon monoxide which accumulates in liquid form in the sump of the distillation column is withdrawn therefrom and, after expansion, is used to cool the upper or head end of the distillation column.

The process of the present invention for separating carbon monoxide from a feed gas stream containing carbon monoxide and nitrogen therefore comprises supplying the feed gas stream to a distillation column, distilling the feed gas stream in the distillation column so as to produce a sump product comprising a first carbon monoxide stream including a substantially pure stream of liquid carbon monoxide and a distillation gas stream containing the nitrogen therein, heating the sump of the distillation column by contacting it with a second carbon monoxide stream, withdrawing the first carbon monoxide stream from the distillation column, expanding the first carbon monoxide stream withdrawn from the distillation column so as to reduce its temperature, cooling the distillation gas stream in the upper portion of the distillation column by contacting it with at least a portion of the expanded first carbon monoxide stream, recycling at least a portion of the first carbon monoxide stream so as to provide the second carbon monoxide stream, and withdrawing at least a portion of the first carbon monoxide stream as a product stream therefrom.

In accordance with a preferred embodiment of the present invention, the feed gas stream also includes hydrogen and methane, and the second carbon monoxide stream preferably comprises a gaseous stream of carbon monoxide. Preferably, heating of the sump of the distillation column comprises direct heat exchange with the second carbon monoxide stream.

Preferably, the distillation column is maintained at a pressure of between about 2 and 3 bar, and expansion of the frist carbon monoxide stream is preferably carried out at a pressure of between about 1 and 2 bar. In a preferred embodiment, the distillation column is maintained at a temperature of between about 80° and 90° K. The distillation gas stream preferably includes about 35 mole percent carbon monoxide therein.

In accordance with one embodiment of the process of the present invention, the feed gas stream containing carbon monoxide and nitrogen is produced from a hydrogen-containing feed gas, and the process includes scrubbing the hydrogen-containing feed gas with a stream of liquid methane in order to scrubb out the carbon monoxide and the nitrogen from the feed gas, separating the dissolved carbon monoxide and nitrogen from the stream of liquid methane in a regeneration column so as to provide a carbon monoxide and nitrogen-containing gas stream therefrom as feed gas stream, and cooling the upper portion of the regeneration column by contact with a carbon monoxide stream being conducted in a carbon monoxide refrigeration cycle.

In accordance with a preferred aspect of this embodiment of the process of the present invention, cooling of the upper portion of the regeneration column comprises indirect heat exchange with at least a portion of the carbon monoxide of the refrigeration cycle.

In another embodiment of the process of the present invention scrubbing of the hydrogen-containing feed gas is carried out at a first predetermined pressure, and the regeneration column is maintained at a second predetermined pressure, and preferably the second predetermined pressure is less than the first predetermined pressure.

In another embodiment of the process of the present invention, this process includes expanding the fraction of liquid methane subsequently to the scrubbing step so as to separate the dissolved hydrogen therefrom, and withdrawing a hydrogen-containing gas as a residual gas stream.

In a preferred embodiment of this process, expansion of the loaded liquid methane stream is carried out in a separating column different from the regeneration column, and preferably the upper portion of the separating column is cooled by contact with liquid carbon monoxide. In one embodiment, this process includes heating the lower portion of the separating column by contact with a stream of gaseous carbon monoxide. These streams of carbon monoxide may be parts of the carbon monoxide refrigeration cycle. In another embodiment, heating of the lower portion of the separation column is effected by contact with a stream of scrubbing methane.

In accordance with another embodiment of the process of the present invention, the feed gas stream is produced from a hydrogen-containing feed gas, and the process includes partially condensing the hydrogen-containing feed gas so as to produce a partial condensate stream containing carbon monoxide and nitrogen, and preparing the feed gas stream from the partial condensate stream.

As can be seen, the present invention employs distillation for the separation of a nitrogen-carbon monoxide mixture. Such separations are considered to be very inefficient in view of the very similar distillation characteristics of these two components, and the separation can thus only be achieved with great effort. Surprisingly enough, however, it has now been found that separation of the nitrogen through distillation has become relatively simple by utilizing the carbon monoxide recycle not only for the cooling requirements in the actual gas separation procedure, but in addition for the nitrogen-carbon monoxide separation in accordance with this invention. As will be further noted from the above, this process can now also be used with various gas separation systems, such as those in connection with fractionating through partial condensation, or those which employ the aid of a methane scrubbing step.

As for the latter, methane scrubbing is usually performed under increased pressures, e.g., in the area of 10 to 70 bar, and if necessary, at even lower or still higher pressures. The scrubbing temperatures are thus in the area of the melting point of the methane, i.e., just above 90.6° K. A scrubbing temperature which is as low as possible is selected in order to perform this step of the process with as little scrubbing agent as possible, and in order to be able to withdraw the purest possible hydrogen stream. Generally, this hydrogen stream will only contain small quantities of methane (in the magnitude of about 1 to 2 molecular percent), which can be attributed to the methane steam pressure in the scrubbing column. Beside the methane itself, the liquid withdrawn from the sump of the scrubbing column contains the nitrogen, the carbon monoxide and the methane contained in the natural gas. Regeneration of the methane scrubbing liquid usually takes place under reduced pressures, and preferably under pressures of about 2 to 3 bar, e.g., at about 2.5 bar. Expansion to regeneration pressure is usually performed in two steps, in order to separate degassing components consisting largely of dissolved hydrogen, and in this manner to maintain them separate from the carbon monoxide product.

According to the present process, the carbon monoxide which is withdrawn from the head or upper end of the regeneration column, which also contains the nitrogen contained in the natural gas, is then transferred to the nitrogen-carbon monoxide-distillation column, at the pressure of the regeneration column. This distillation column thus preferably operates in the pressure range of between about 2 to 3 bar, e.g., at about 2.5 bar. Carbon monoxide in the refrigeration cycle, which has been reheated and passed through the recycle compressor, and which is now at the pressure of the distillation column and at the condensation point temperature, is now also available. It is then fed into the sump of the distillation column as a heating medium, where it is preferably fed into the sump in a gaseous form. Suitable temperatures for this sump are in the range of between about 87° and Σ° K., e.g., about 91° K. The pure carbon monoxide withdrawn from the sump is then expanded and fed into a head condenser in the upper portion of the column as a coolant medium. The expansion usually has an available pressure drop of only between about 1 and 2 bar, since after being heated to ambient temperature the expanded carbon monoxide should generally enter the suction side of the compressor under a pressure only slightly higher than atmospheric pressure. The use of a compressor with a suction pressure which is lower than atmospheric pressure would certainly increase the available pressure difference during expansion of the liquid carbon monoxide. However, this would also require rather extensive means for protection of the compressor. The pressure difference available during expansion thus permits elevation of the liquid carbon monoxide to a predetermined level without the use of a pump. This difference in pressure elevation, which has to be overcome on its own power, can amount, for example, to about 12 m at an expansion of 1 bar. If no additional pump is to be used, the maximum height of the distillation column may then be calculated for each individual application.

By using this expanded sump fraction for such cooling purposes, a temperature in the range of between about 80° and 87° K., can be maintained at the head or upper end of the distillation column. Should the amount of sump product not suffice for such cooling, then additional carbon monoxide may be delivered for such purposes, preferably from a storage tank within the recycle system, and after being expanded to the same pressure level as the sump product, and mixed therewith. A nitrogen rich fraction, still comprising polluted carbon monoxide, is then withdrawn from the upper end of the distillation column. This fraction could be used, for example, as heating gas. It has been found to be advantageous to selectively control the distillation conditions in such a way that a nitrogen fraction is withdrawn from the upper end of the distillation column, which is polluted with carbon monoxide at about 35 mole percent.

The quantities of nitrogen which can thus be separated from a carbon monoxide steam in accordance with this process will depend on the individual limiting conditions of each such process, and may be calculated in a conventional manner. For example, if the methane scrubbing is performed under a pressure of 14 bar and the cooling requirements are supplied by the energy provided by the expansion of hydrogen as well as by the recycled carbon monoxide, then nitrogen can be separated from the upper or overhead portion of the regeneration column in quantities of about 9 mole percent. This is equivalent to about the same quantitiy of nitrogen contained in natural gas which has yet to be reformed. By utilizing the turbine expansion of carbon monoxide, higher nitrogen levels are permitted. In a more preferred embodiment of this process, the carbon monoxide-methane separation column which is used for the regeneration of the methane scrubbing agent is cooled at its upper end by indirect heat exchange with recycled liquid carbon monoxide. This procedure varies from conventional methods of regeneration, primarily since cooling of the upper portion of this column is achieved indirectly with carbon monoxide, whereas usually liquid carbon monoxide is fed directly onto the column head. Indirect cooling in accordance with this invention is, however, more beneficial, since on the one hand feeding of the liquid carbon monoxide increases the quantity of gas filing the distillation column, and on the other hand it dilutes the nitrogen content of this quantity of gas.

In yet another embodiment of the process of this invention, separation of the degassed components, which is to be carried out within the framework of a two step expansion, is performed in a separation column. As compared to the use of a simple separator, installation of even a relatively small separation column provides the advantage that the hydrogen can be separated from the liquid substantially more easily, and therefore the nitrogen-carbon monoxide column is no longer burdened with hydrogen (i.e., there can be a dew point reduction in the column head). The separation column is heated by means of the scrubbing methane in the sump and/or the carbon monoxide which is carried in the system, cooled in the column head with liquid carbon monoxide, and withdrawn from the system, so as to reduce the loss of carbon monoxide.

BRIEF SUMMARY OF THE DRAWINGS

Further details of the process of the present invention are set forth in the following detailed description, and with reference to the drawings, in which.

DETAILED DESCRIPTION

Figure 1:
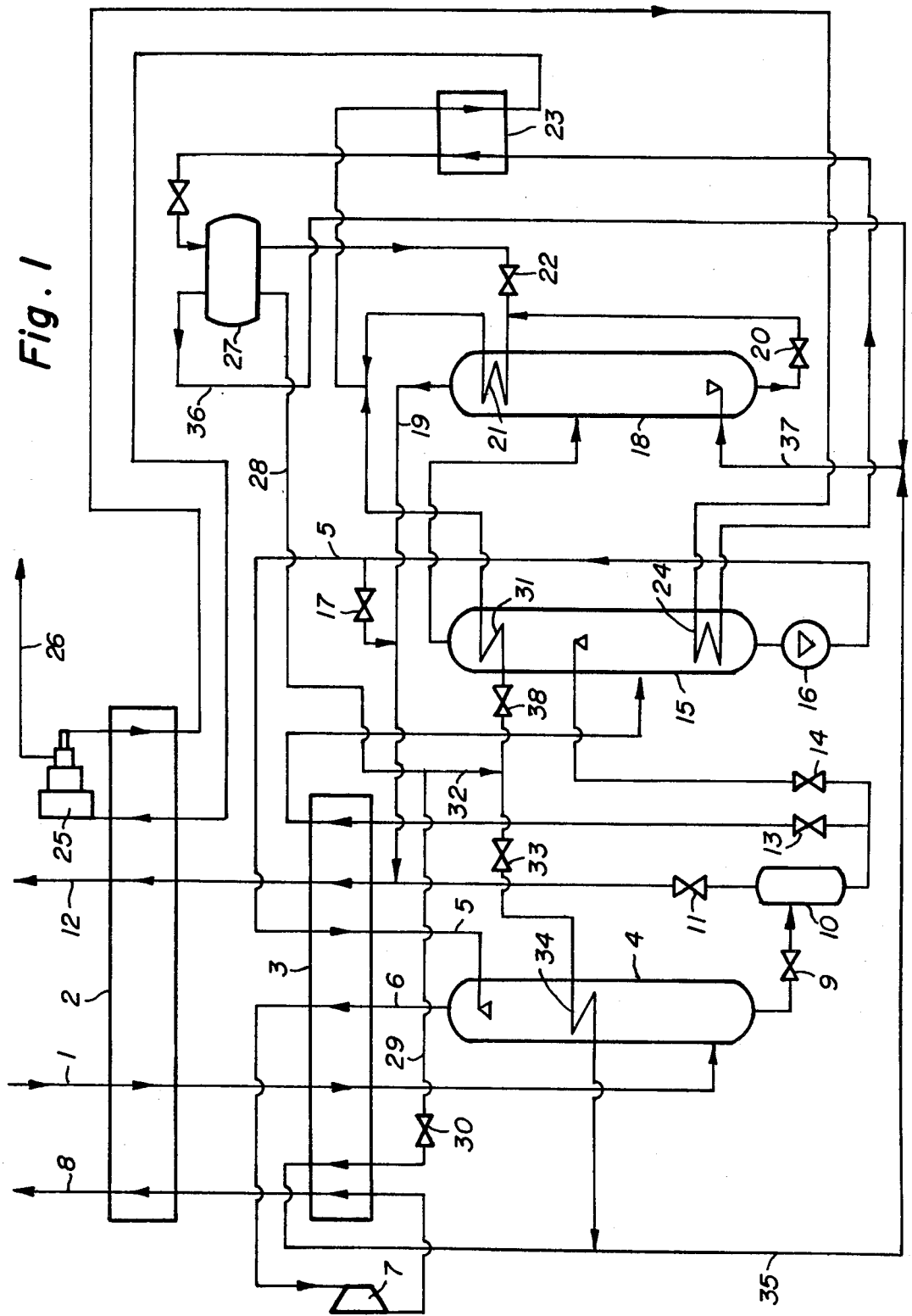
FIG. 1 is a schematic representation of the process of the present invention in conjunction with a methane scrubbing.

Referring to the figures, in which like numerals refer to like portions, thereof, FIG. 1 shows a synthesis gas stream produced by steam reforming of a natural gas stream entering through line 1, and containing 70.54 mole percent hydrogen, 24.69 mole percent carbon monoxide, 3.49 mole percent methane, and 1.28 mole percent nitrogen. This synthesis gas was produced by reforming a natural gas stream having a 5 mole percent nitrogen content. Generally, natural gases with nitrogen contents of up to about 15 mole percent may be used in the process according to this invention. If gases with higher nitrogen contents are available, then the use of a nitrogen separation procedure prior to steam reforming will be more economical than will be use of the process of the invention.

The gas stream enters through line 1 under a pressure of 14 bar, and at a temperature of 36° C. In heat exchangers 2 and 3 this gas stream is cooled down to about 92° K., whereby most of the methane and carbon monoxide contained in the synthesis gas will condense. The two phase mixture is then fed to the lower end of methane scrubbing column 4. In scrubbing column 4 the remaining carbon monoxide gas is scrubbed out with liquid methane, which is fed into this scrubbing column through line 5 at the upper end thereof. Purified hydrogen, containing only about 1.5 mole percent methane, 0.2 mole percent nitrogen, and 10 ppm of carbon monoxide is then withdrawn through line 6 from the head of scrubbing column 4. This hydrogen fraction can then be warmed up in heat exchanger 3, and then expanded in order to provide the cooling requirements in turbine 7, and after being warmed up again in heat exchangers 3 and 2, can be released as product hydrogen through line 8.

The scrubbing methane, together with all the carbon monoxide, most of the nitrogen, and possibly some dissolved hydrogen, are withdrawn from the lower end of scrubbing column 4, and expanded in valve 9 to a pressure of about 4 bar. The hydrogen dissolved in the scrubbing methane degases as well as carbon monoxide, nitrogen and methane according to the conditions of equilibrium. The degassed components, containing approximately equal parts of hydrogen and carbon monoxide, are separated in separator 10, expanded in valve 11 and, after warming in heat exchangers 3 and 2, can be withdrawn as a heating gas fraction through line 12.

In another embodiment of this invention, separator 10 can be replaced by a small distillation column, the head of which is under a pressure of about 1.5 bar, and which is cooled with circulating carbon monoxide at a temperature of about 86° K. This reduces the percentage of carbon monoxide in this heating gas fraction to less than about 40 mole percent.

The liquid which accumulates in separator 10, or in the corresponding distillation column, is then separated into two partial streams, and expanded to about 2.5 bar in valves 13 and 14. The partial stream expanded in valve 13 condenses in heat exchanger 3, and is then removed in regeneration column 15. The partial stream expanded in valve 14 enters directly into regeneration column 15, at some level above the other stream (i.e., that which was expanded in valve 13). Regeneration column 15 contains a head condenser 31, as well as a heater 24 for the sump, both of which are operated by the recycling carbon monoxide. Pure methane collects in the sump of column 15, and it is then brought up to the pressure of natural gas in pump 16. The methane required as scrubbing agent then branches off through line 5, where it is undercooled in heat exchanger 3 and fed back into scrubbing column 4. Excess methane is expanded in valve 17, and added to the heating gas fraction withdrawn from separator 10. The overhead product from regeneration column 15 is a mixture of 95.05 mole percent carbon monoxide, 4.8 mole percent nitrogen, 0.1 mole percent methane, and 0.05 mole percent hydrogen. This gas stream is then fed into the central section of distillation column 18, which also operates with a pressure of about 2.5 bar (neglecting any drop in pressure).

A stream of nitrogen, containing the remaining hydrogen and about 35 mole percent carbon monoxide, is withdrawn through line 19 from the upper end of the distillation column, and added to the aforesaid heating gas fraction. The sump product of pure carbon monoxide is withdrawn from distillation column 18, and then expanded to about 1.5 bar in valve 20, during which step the temperature drops from 90.5° to 85° K. The carbon monoxide is then vaporized in condenser 21 contained in the upper end of column 18. A small quantity of liquid carbon monoxide is fed into condenser 21 through valve 22, in order to compensate for any cold loss during the nitrogen-carbon monoxide separation.

After its vaporization in condenser 21, the carbon monoxide withdrawn from the sump of distillation column 18, which contains both product and recycled carbon monoxide, is then warmed against supercooling liquid carbon monoxide in heat exchanger 23, and then heated in heat exchanger 2. This carbon monoxide stream is then fed into a compressor 25 at a pressure of 1.1 bar from which product carbon monoxide is then withdrawn through line 26 at a suitable pressure. Carbon monoxide which is to remain in the cycle, after compression to about 30 bar, is then cooled down in heat exchanger 2, condensed in the sump heater 24 in regeneration column 15, supercooled in heat exchanger 23 against carbon monoxide which is to be warmed thereby, and expanded to about 2.5 bar in the carbon monoxide storage container 27. The various cooling requirements are then supplied by this liquid carbon monoxide. One partial stream of this liquid carbon monoxide is thus fed to heat exchanger 3 through lines 28 and 29 and valve 30, where it is vaporized, while another partial stream is transported to cooler 34 in the scrubbing column 4 through lines 28 and 32, as well as valve 33. After vaporization in heat exchangers 3 and 34, respectively, these two carbon monoxide streams are merged and, at a pressure of 2.5 bar, discharged through line 35. This gas is mixed with the expansion gas from container 27, which is withdrawn through line 36, and the mixture is then fed into the sump of distillation column 18 through line 37 in order to provide the necessary sump heating.

Another partial stream of the liquid carbon monoxide in container 27 is withdrawn through line 28, expanded in valve 38 to a pressure of 1.5 bar, and used as a coolant in heat exchanger 31 at the upper end of regeneration column 15. Subsequently, this vaporized carbon monoxide stream is mixed with the stream of carbon monoxide which had been vaporized in the condenser 21 of distillation column 18 and, after being preheated in heat exchanger 23, is again fed into carbon monoxide compressor 25.

Figure 2:
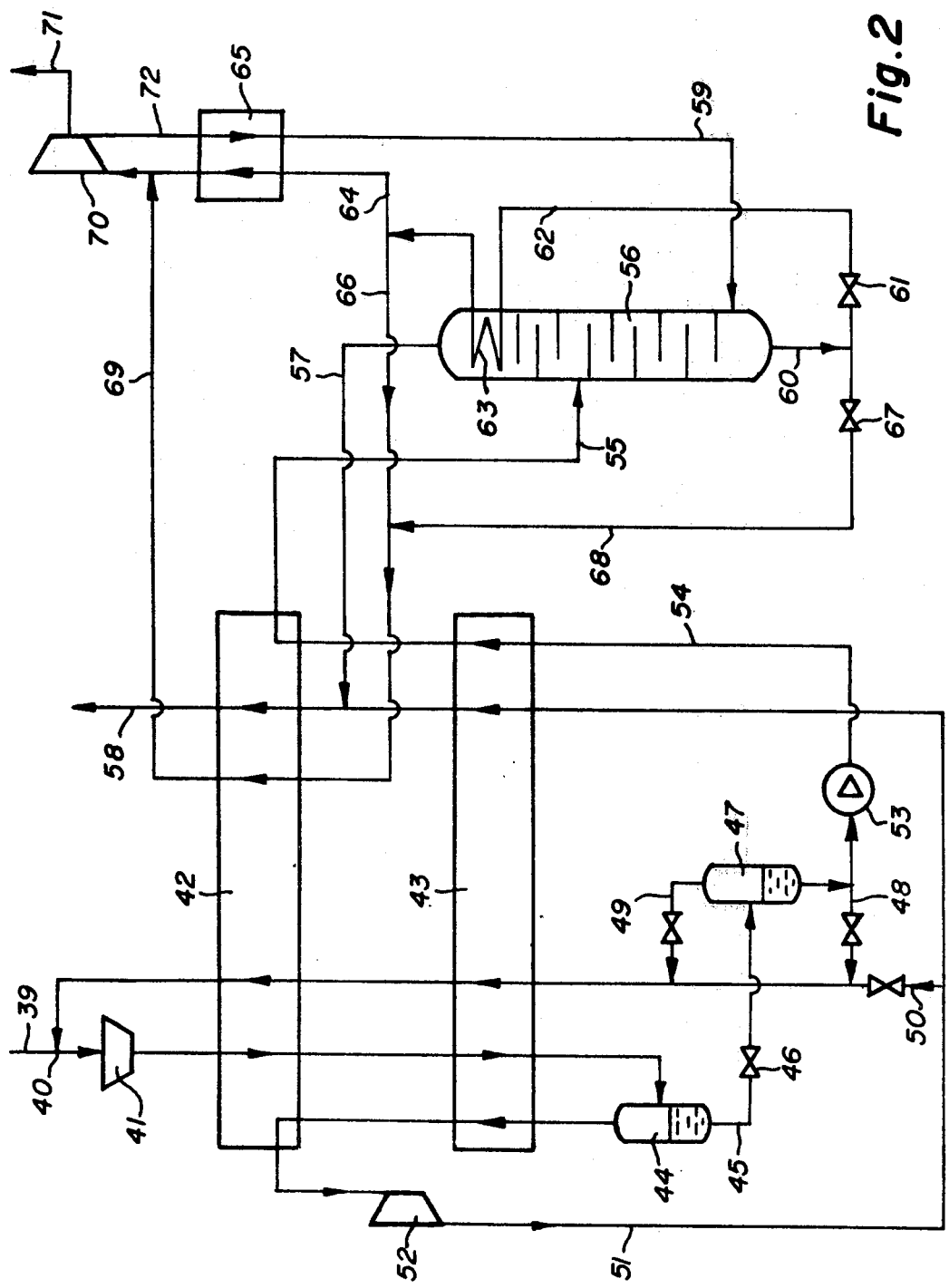
FIG. 2 is a schematic representation of the process of the present invention in conjunction with a partial condensation.

Referring next to FIG. 2., the process illustrated therein is particularly suitable for the recovery of gas mixtures having low methane contents, since no methane separation step is provided.

In this case, a gas stream rich in carbon monoxide, and containing 29.7 mole percent hydrogen, 4.2 mole percent nitrogen, 0.1 mole percent methane and 66 mole percent carbon monoxide, is fed into the system through line 31. This gas is fed into an open mixed refrigerant cooling cycle at 40, primarily containing hydrogen and carbon monoxide, and then compressed in compressor 41. The gas is then cooled to about 78° K. in heat exchangers 42 and 43, thereby forming a carbon monoxide rich condensate, which is separated in separator 44. In order to degas dissolved hydrogen, the condensate withdrawn from separator 44 through line 45 is expanded in valve 46 to about 1.5 bar, and then passed to another separator 47.

The liquid phase from separator 47 consists of a carbon monoxide-nitrogen mixture. A partial stream of this liquid is withdrawn through line 48 and fed into the open cooling cycle. This cycle is also fed with expansion gas from the separator 47 through line 49, as well as by a partial stream 50 from the downflow 51 of expansion turbine 52, in which the hydrogen rich gas phase from separator 44 is expanded to provide the cooling requirements, after warming in heat exchangers 43 and 42. The gas mixture formed from lines 48, 49 and 50 thus represents a source of coolant, is present at very low temperatures, which is warmed against process streams which are thus to be cooled in heat exchangers 43 and 42, and then finally mixed with crude gas at 40.

The principal liquid stream withdrawn from separator 47 is fed to pump 53 at a pressure of about 2.6 bar, fed to heat exchanger 43 through line 54, warmed, partially vaporized in heat exchanger 42, and fed through line 55 for expansion in nitrogen separator column 56. The overhead product from column 56 is the nitrogen fraction, which is withdrawn through line 57, and fed into residual gas line 58, which also carries the excess portion of the turbine downflow 51. Column 56 is heated by injecting a stream of cold carbon monoxide therein through line 59. This stream then leaves column 56 in liquid form with the carbon monoxide product stream, through line 60. A portion of this sump product is expanded to 1.5 bar in valve 60, and fed through line 62 to the overhead condenser 63 in the upper portion of column 56, where it is then vaporized. This vaporized low pressure carbon monoxide is then fed to heat exchanger 65 through line 64, and warmed against recycling carbon monoxide. A partial stream of the vaporized carbon monoxide, however, can be fed through line 66 for mixture with the remaining portion of the sump product from column 56, which is expanded in valve 67, and then withdrawn through line 68. This fraction is used as additional coolant in heat exchanger 65. These streams can then be fed into carbon monoxide compressor 70. Carbon monoxide product is then withdrawn through line 71 at a suitable pressure level, while that portion which is to remain in the cycle is withdrawn through line 72 and fed into heat exchanger 65, where it is cooled prior to again being fed into column 56.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What is claimed is:

1. A process for obtaining carbon monoxide by the distillation of a mixture of carbon monoxide and nitrogen comprising supplying said mixture of carbon monoxide and nitrogen to a distillation column, distilling said mixture of carbon monoxide and nitrogen in said distillation column so as to produce a sump product comprising a first substantially pure stream of liquid carbon monoxide and a head product comprising a distillation gas stream containing said nitrogen therein, heating the sump in the lower portion of said distillation column by contacting said sump with a second carbon monoxide stream, withdrawing said sump product from said distillation column, expanding said sump product withdrawn from said distillation column so as to reduce the temperature thereof, cooling said distillation gas stream in the upper portion of said distillation column by contacting said distillation gas stream with at least a portion of said expanded sump product, recycling at least a portion of said sump product so as to provide said second carbon monoxide stream, and withdrawing at least a portion of said sump as a substantially pure carbon monoxide product stream.

2. The process of claim 1 wherein said second carbon monoxide stream comprises a gaseous stream of carbon monoxide.

3. The process of claim 2 wherein said heating of said sump in said lower portion of said distillation column comprises direct heat exchange with said second carbon monoxide stream.

4. The process of claim 1 wherein said distillation column is maintained at a pressure of between about 2 and 3 bar.

5. The process of claim 1 wherein said expanding of said sump product is carried out at a pressure of between about 1 and 2 bar.

6. The process of claim 1 wherein said distillation column is maintained at a temperature of between about 80° and 90° K.

7. The process of claim 1 wherein said distillation gas stream includes approximately 35 mole percent carbon monoxide therein.

8. The process of claim 1 wherein said mixture of carbon monoxide and nitrogen is produced from a hydrogen-containing feed gas, and including scrubbing said hydrogen-containing feed gas with a stream of liquid methane so as to provide a liquid methane-containing stream including at least a portion of said carbon monoxide and said nitrogen therein, separating said carbon monoxide and said nitrogen from said liquid methane-containing stream in a regeneration column so as to provide a carbon monoxide and nitrogen-containing gas stream therefrom, and cooling the upper portion of said regeneration column by contact with a carbon monoxide stream being conducted in a carbon monoxide refrigeration cycle.

9. The process of claim 8 wherein said cooling of said upper portion of said regeneration column comprises indirect heat exchange with said at least a portion of said carbon monoxide stream.

10. The process of claim 8 wherein said scrubbing of said hydrogen-containing feed gas is carried out at a first predetermined pressure, and wherein said regeneration column is maintained at a second predetermined pressure, and wherein said second predetermined pressure is less than said first predetermined pressure.

11. The process of claim 10, including expanding said liquid methane containing stream including at least a portion of said carbon monoxide and said nitrogen therein so as to separate dissolved hydrogen therefrom and wherein a gas stream containing said hydrogen is withdrawn as a residual gas stream.

12. The process of claim 11, wherein said expanding of said liquid methane containing stream including at least a portion of said carbon monoxide and said nitrogen is carried out in a separating column.

13. The process of claim 12, including cooling the upper portion of said separating column by contact with liquid carbon monoxide.

14. The process of claim 12, including heating the lower portion of said separating column by contact with gaseous carbon monoxide.

15. The process of claim 1 wherein said mixture of carbon monoxide and nitrogen is produced from a hydrogen-containing feed gas, and including partially condensing said hydrogen-containing feed gas so as to produce a partial condensate stream containing said mixture of carbon monoxide and nitrogen therein.

* * * * *

UNITED STATES PATENT AND TRADEMARK OFFICE
CERTIFICATE OF CORRECTION

PATENT NO. : 4,478,621
DATED : October 23, 1984
INVENTOR(S) : Rainer·Fabian

It is certified that error appears in the above-identified patent and that said Letters Patent are hereby corrected as shown below:

Column 4, line 38, "$\Sigma^{\circ}$" should read -- $93^{\circ}$ --.

Signed and Sealed this

Sixteenth Day of April 1985

[SEAL]

Attest:

DONALD J. QUIGG

Attesting Officer     Acting Commissioner of Patents and Trademarks